United States Patent
Cozzo et al.

(10) Patent No.: US 12,418,898 B2
(45) Date of Patent: Sep. 16, 2025

(54) TRANSMISSION OF UPLINK CHANNELS WITH REPETITIONS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/655,134

(22) Filed: Mar. 16, 2022

(65) Prior Publication Data

US 2022/0312413 A1   Sep. 29, 2022

Related U.S. Application Data

(60) Provisional application No. 63/291,094, filed on Dec. 17, 2021, provisional application No. 63/164,784, filed on Mar. 23, 2021.

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0003* (2013.01); *H04L 1/1812* (2013.01);
(Continued)

(58) Field of Classification Search
CPC .................................................. H04W 72/0446
See application file for complete search history.

(56) References Cited

U.S. PATENT DOCUMENTS

| 10,194,330 B2 | 1/2019 | Wong et al. |
| 2012/0314678 A1 | 12/2012 | Ko et al. |

(Continued)

FOREIGN PATENT DOCUMENTS

| EP | 2541796 B1 | 10/2018 |
| WO | 2020164811 A1 | 8/2020 |
| WO | 2023123040 A1 | 7/2023 |

OTHER PUBLICATIONS

International Search Report and Written Opinion issued Jun. 16, 2022 regarding International Application No. PCT/KR2022/003941, 8 pages.

(Continued)

*Primary Examiner* — Abdeltif Ajid

(57) ABSTRACT

Apparatuses and methods for transmission of uplink channels with repetitions in a wireless communication system. A method includes receiving first information that includes a modulation and coding scheme (MCS) field associated with transmission of a physical uplink shared channel (PUSCH). The MCS field includes a number of bits, a first value of a first number of bits, from the number of bits, indicates a first number of repetitions for the transmission of the PUSCH, and a second value of a third number of bits, from the number of bits excluding the first number of bits, indicates an MCS index for the transmission of the PUSCH. The method further includes determining the first number of repetitions based on the first value; determining an MCS for the transmission of the PUSCH based on the second value; and transmitting the PUSCH with the first number of repetitions and the MCS.

15 Claims, 11 Drawing Sheets

(51) Int. Cl.
*H04L 1/1812* (2023.01)
*H04L 5/00* (2006.01)
*H04W 72/23* (2023.01)

(52) U.S. Cl.
CPC .......... *H04L 5/0048* (2013.01); *H04L 5/0055* (2013.01); *H04W 72/23* (2023.01)

(56) References Cited

U.S. PATENT DOCUMENTS

| | | | |
|---|---|---|---|
| 2020/0092858 | A1 | 3/2020 | Ye et al. |
| 2020/0136781 | A1* | 4/2020 | Yi .......................... H04W 76/27 |
| 2022/0029733 | A1* | 1/2022 | Ye ......................... H04B 7/1851 |
| 2022/0232639 | A1* | 7/2022 | Wang .................... H04L 1/0003 |
| 2022/0240281 | A1* | 7/2022 | Wang .................... H04L 5/0053 |
| 2022/0322396 | A1* | 10/2022 | Yu ......................... H04L 5/0051 |
| 2023/0239865 | A1* | 7/2023 | Hu .................... H04W 72/1263 370/329 |
| 2024/0073965 | A1* | 2/2024 | Seok ..................... H04L 5/0012 |

OTHER PUBLICATIONS

Moderator (Ericsson), "FL Summary for [102-e-NRU-unlic-NRU-ULSignalsChannels] Email discussion/approval", 3GPP TSG-RAN WG1 Meeting #102-e, R1-2007029, Aug. 2020, 18 pages.

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

Extended European Search Report issued Jul. 17, 2024 regarding Application No. 22776032.9, 9 pages.

ZTE, "Discussion on UL and DL 16QAM for Nb-Iot", 3GPP TSG RAN WG1 #104-e, R1-2100567, Jan. 2021, 12 pages.

* cited by examiner

TRANSMISSION OF UPLINK CHANNELS WITH REPETITIONS

CROSS-REFERENCE TO RELATED APPLICATION AND CLAIM OF PRIORITY

This application claims priority under 35 U.S.C. § 119(e) to U.S. Provisional Patent Application No. 63/164,784 filed on Mar. 23, 2021 and U.S. Provisional Patent Application No. 63/291,094 filed on Dec. 17, 2021. The above-identified provisional patent applications are hereby incorporated by reference in their entirety.

TECHNICAL FIELD

The present disclosure relates generally to wireless communication systems and, more specifically, the present disclosure relates to transmission of uplink channels with repetitions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to transmission of uplink channels with repetitions.

In one embodiment, a user equipment (UE) is provided. The UE includes a transceiver configured to receive first information that includes a modulation and coding scheme (MCS) field associated with transmission of a physical uplink shared channel (PUSCH). The MCS field includes a number of bits. A first value of a first number of bits, from the number of bits, indicates a first number of repetitions for the transmission of the PUSCH. A second value of a third number of bits, from the number of bits excluding the first number of bits, indicates an MCS index for the transmission of the PUSCH. The UE further includes a processor operably coupled to the transceiver. The processor is configured to determine the first number of repetitions based on the first value and an MCS for the transmission of the PUSCH based on the second value. The transceiver is further configured to transmit the PUSCH with the first number of repetitions and the MCS.

In another embodiment, a base station (BS) is provided. The BS includes a transceiver configured to transmit first information that includes a MCS field associated with reception of a PUSCH. The MCS field includes a number of bits, a first value of a first number of bits, from the number of bits, indicates a first number of repetitions for the reception of the PUSCH, and a second value of a third number of bits, from the number of bits excluding the first number of bits, indicates an MCS index for the reception of the PUSCH. The BS further includes a processor operably coupled to the transceiver. The processor is configured to determine the first number of repetitions based on the first value and an MCS for the reception of the PUSCH based on the second value. The transceiver is further configured to receive the PUSCH with the first number of repetitions and the MCS.

In yet another embodiment, a method is provided. The method includes receiving first information that includes a MCS field associated with transmission of a PUSCH. The MCS field includes a number of bits, a first value of a first number of bits, from the number of bits, indicates a first number of repetitions for the transmission of the PUSCH, and a second value of a third number of bits, from the number of bits excluding the first number of bits, indicates an MCS index for the transmission of the PUSCH. The method further includes determining the first number of repetitions based on the first value; determining an MCS for the transmission of the PUSCH based on the second value; and transmitting the PUSCH with the first number of repetitions and the MCS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
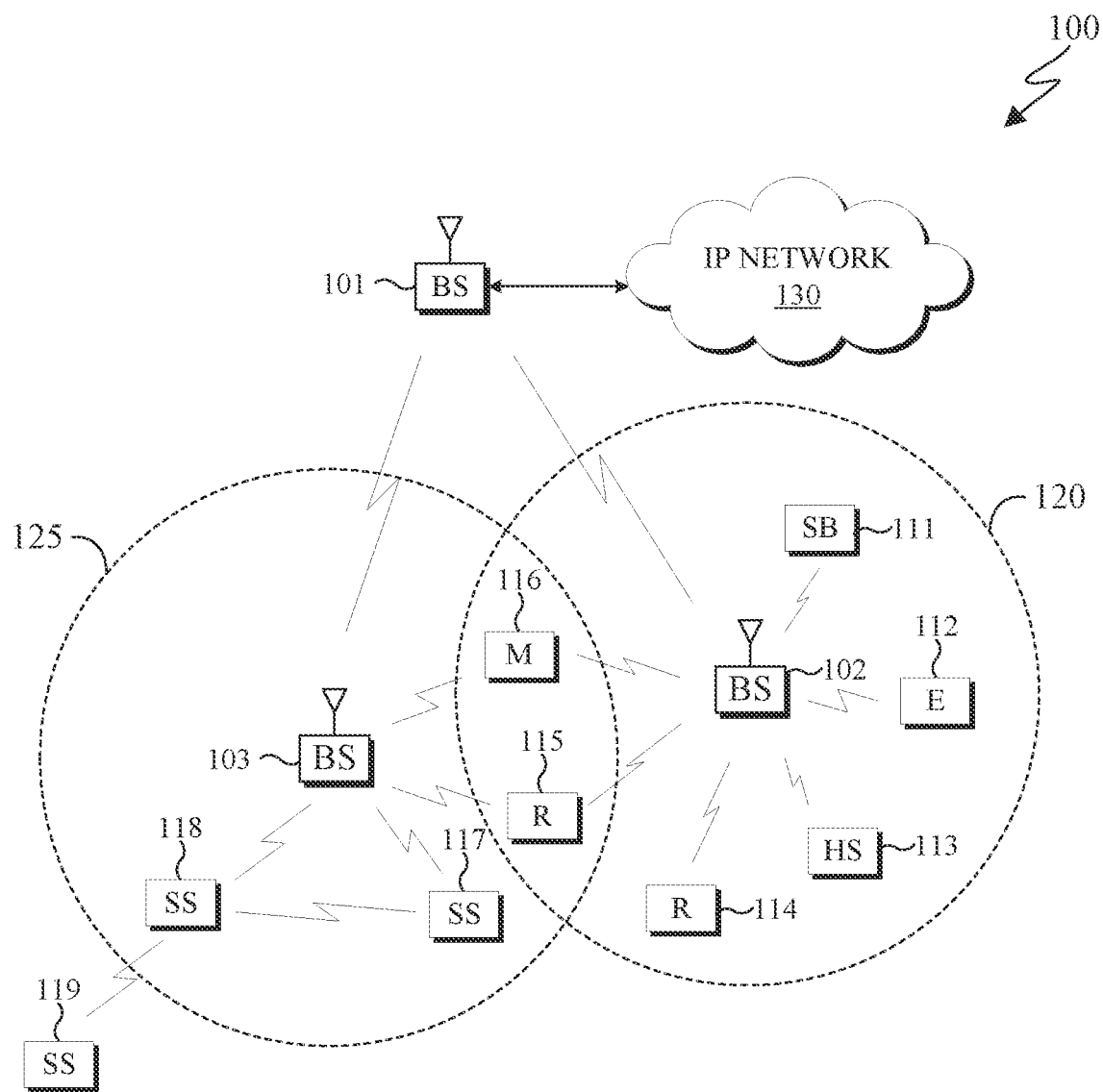
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and channel coding" ("REF2"); 3GPP TS 38.213 v16.4.0, "NR; Physical layer procedures for control" ("REF3"); 3GPP TS 38.214 v16.4.0, "NR; Physical layer procedures for data" ("REF4"); 3GPP TS 38.321 v16.3.0, "NR; Medium Access Control (MAC) Protocol Specification" ("REF5"); and 3GPP TS 38.331 v16.3.1, "NR; Radio Resource Control (RRC) Protocol Specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
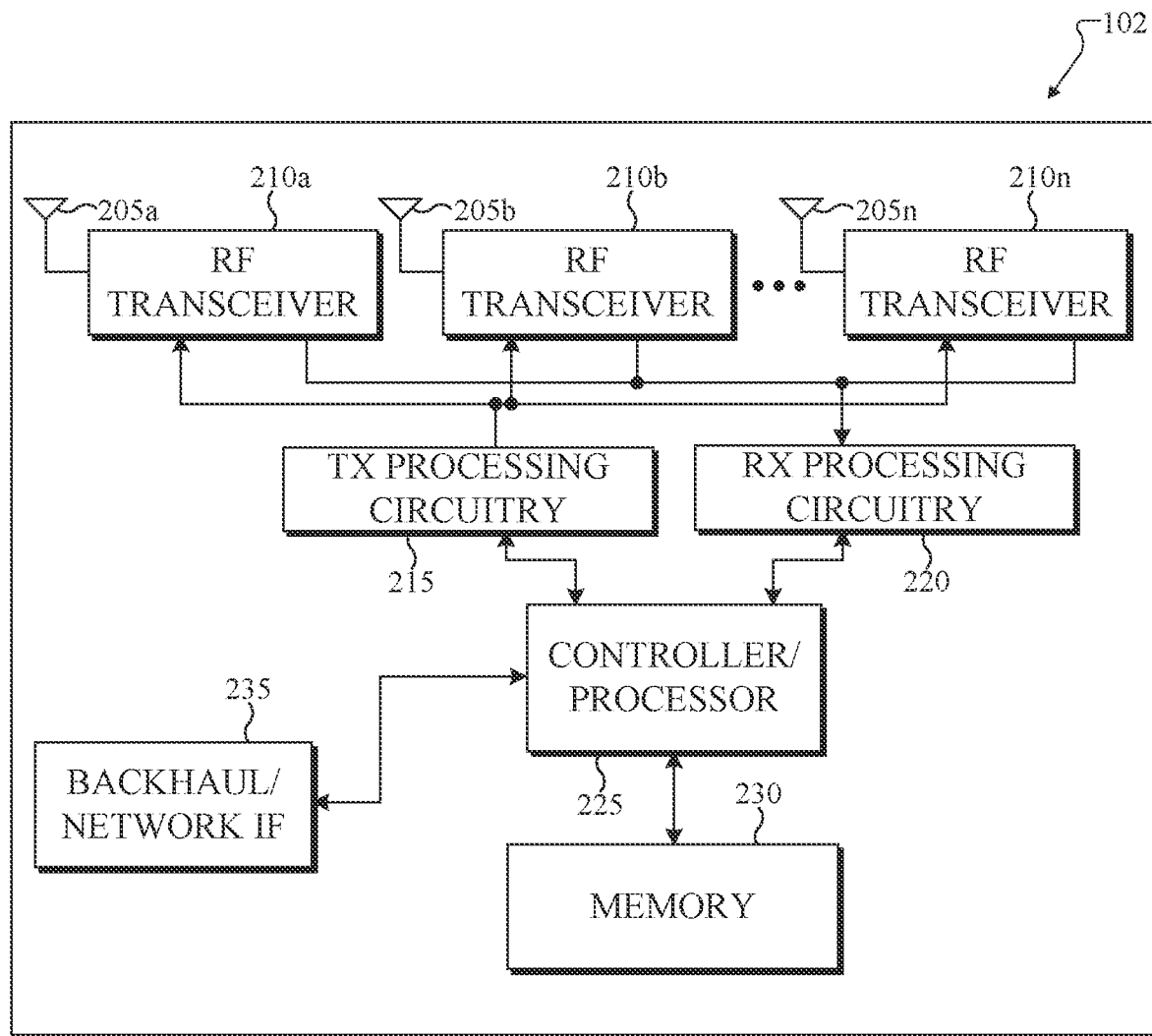
FIG. 2 illustrates an example BS according to embodiments of the present disclosure.
Figure 3:
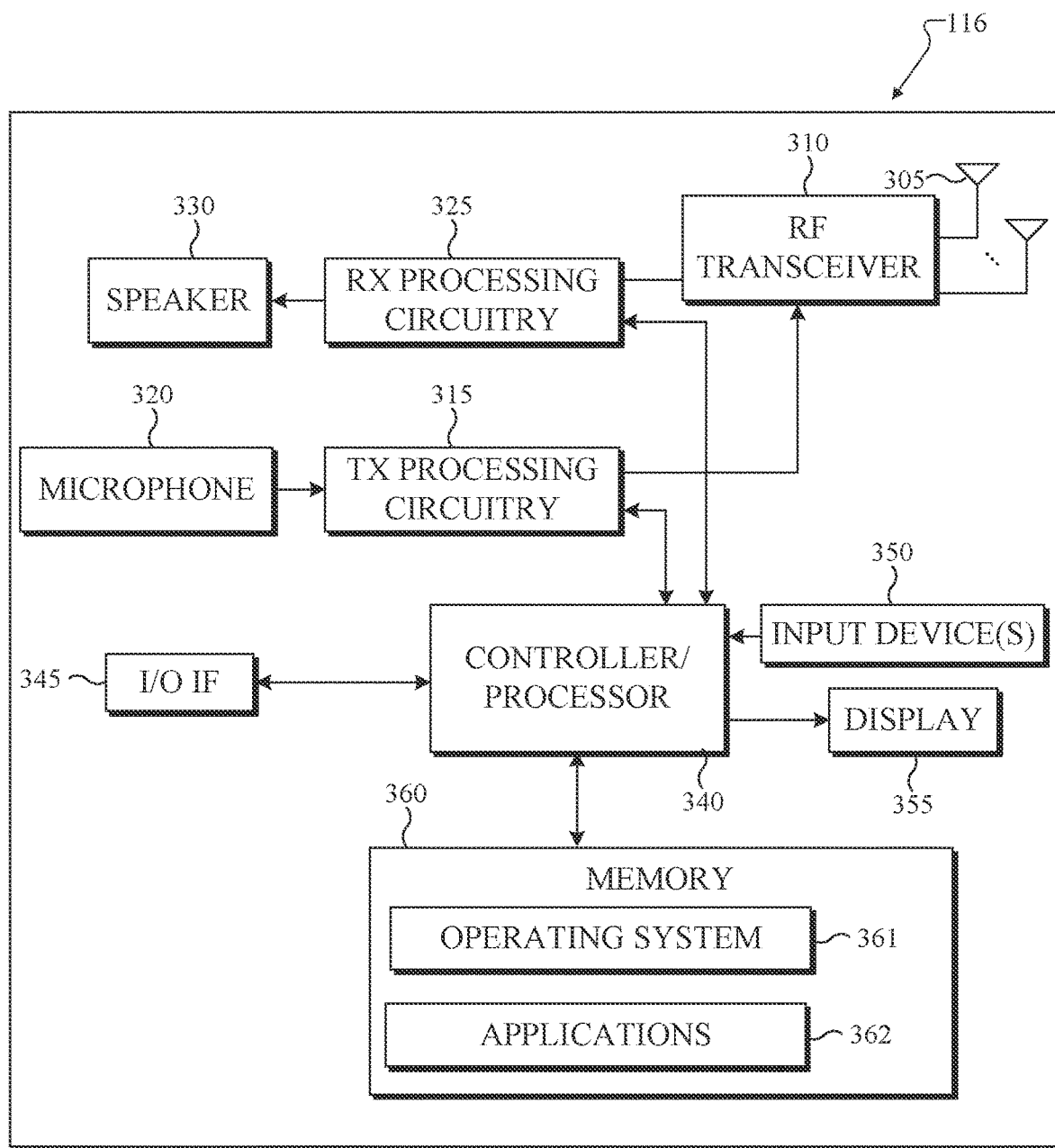
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays. Additionally, as described in more detail below, one or more of the UEs 111-119 include circuitry, circuitry, programing, or a combination thereof for transmission of uplink channels with repetitions. In certain embodiments, and one or more of the BSs 101-103 includes circuitry, programing, or a combination thereof for transmission of uplink channels with repetitions.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support transmission of uplink channels with repetitions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
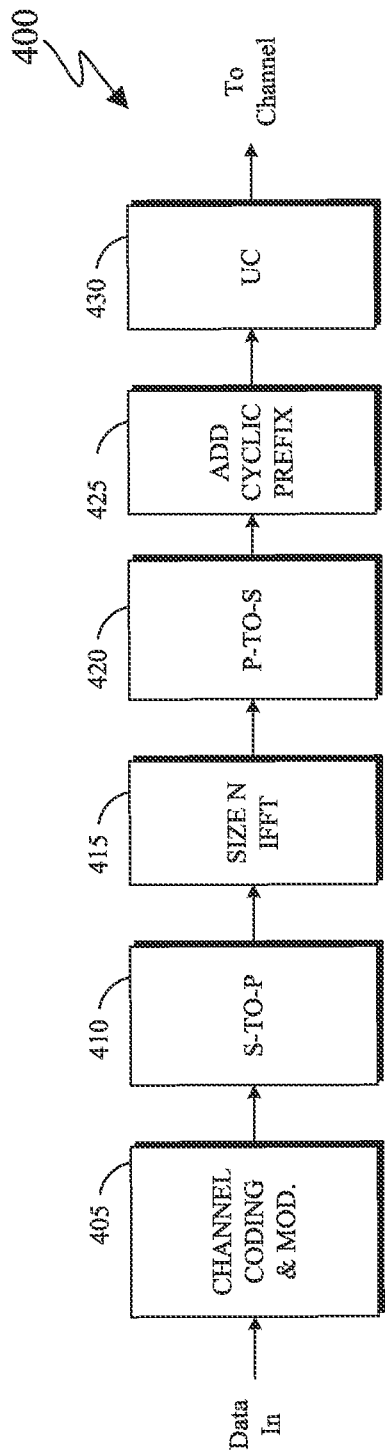
FIGS. 4 and 5 illustrate example wireless transmit and receive paths according to embodiments of the present disclosure.
Figure 5:
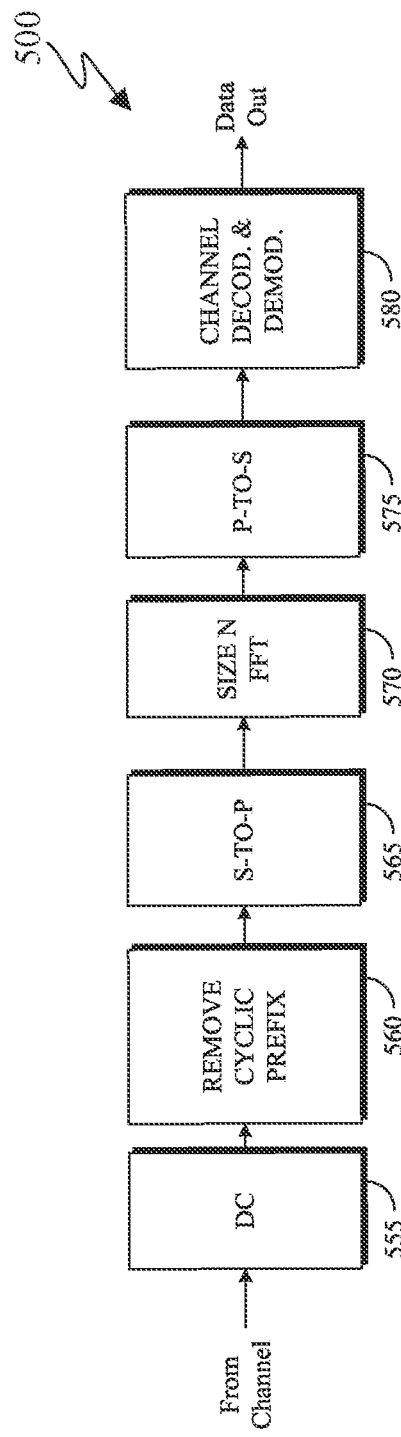

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support transmission of uplink channels with repetitions as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^\mu \cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB (such as BS 102) transmits data information or DCI through respective physical DL shared channels (PDSCHs) or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TB s), wherein a TB is associated with a hybrid automatic repeat request (HARQ) process that is indicated by a HARQ process number field in a DCI format scheduling the PDSCH reception or activating a SPS PDSCH reception and a redundancy version (RV) that is indicated by a RV field in the DCI format when incremental redundancy is used for encoding the TB. A TB transmission can be an initial one or a retransmission as identified by a new data indicator (NDI) field in the DCI format scheduling a PDSCH reception that provides a TB retransmission for a given HARQ process number.

In certain embodiments, a gNB (such as BS 102) transmits one or more of multiple types of RS including channel state information RS (CSI-RS) and demodulation RS (DM-RS)—see also REF1.

A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF3). The CSI-IM resources can also be associated with a zero power CSI-RS (ZP CSI-RS) configuration. A UE can determine CSI-RS reception parameters through DL control signaling or higher layer signaling, such as RRC signaling from a gNB (see also REF5). A DM-RS is typically transmitted only within a BW of a respective PDCCH or PDSCH and a UE can use the DM-RS to demodulate data or control information.

A UE (such as the UE 116) can monitor multiple candidate locations for respective potential PDCCH receptions to decode multiple DCI formats in a slot, for example as described in REF3. A DCI format includes cyclic redundancy check (CRC) bits in order for the UE to confirm a correct detection of the DCI format. A DCI format type is identified by a radio network temporary identifier (RNTI) that scrambles the CRC bits (see also REF2).

For a DCI format scheduling a PDSCH or a physical uplink shared channel (PUSCH) to a single UE, the RNTI can be a cell RNTI (C-RNTI), or a configured scheduling RNTI (CS-RNTI), or a modulation and coding scheme (MCS) cell RNTI (MCS-C-RNTI) and serves as a UE identifier. In the following, for brevity, only the C-RNTI will be referred to when needed. A UE (such as the UE 116) can receive/monitor PDCCH for detections of DCI formats with CRC scrambled by a C-RNTI according to a UE-specific search space (USS). For a DCI format 0_0 and a DCI format 1_0 that schedule PUSCH transmissions and PDSCH receptions, respectively, to a UE, the UE can additionally be configured to monitor corresponding PDCCH according to common search space (CSS). For a DCI format 0_1 and a DCI format 0_2 that are mainly used to schedule PUSCH transmissions or for a DCI format 1_1 and a DCI format 1_2 that are mainly used to schedule PDSCH receptions, the UE monitors corresponding PDCCH according to a USS. PDCCH monitoring implies reception of PDCCH candidates and decoding of potential DCI formats.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or physical uplink control channel (PUCCH) transmissions, a DCI format 2_3 providing TPC commands for SRS transmissions and also potentially triggering a SRS transmission on a number of cells, and so on, and a corresponding CSS is referred to as Type3-PDCCH CSS.

In certain embodiments, UL signals also include data signals conveying information content, control signals conveying UL control information (UCI), DM-RS associated with data or UCI demodulation, phase-tracking RS (PT-RS) used for phase tracking in symbols of a PUSCH, and sounding RS (SRS) enabling a gNB to perform UL channel measurement, and a random access (RA) preamble enabling a UE to perform random access (see also REF1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

Certain UL RS includes DM-RS, PT-RS, and SRS. DM-RS is typically transmitted within a BW of a respective PUSCH or PUCCH. A gNB (such as the BS 102) can use a DM-RS to demodulate information in a respective PUSCH or PUCCH. SRS is transmitted by a UE (such as the UE 116) to provide a gNB (such as the BS 102) with an UL CSI and, for a TDD system, to also provide a precoding matrix indicator (PMI) for DL transmission. Further, as part of a random access procedure or for other purposes, a UE can transmit a physical random access channel (PRACH).

UCI can include HARQ-acknowledgement (ACK) information, indicating correct or incorrect decoding of TBs or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE (such as the UE 116) transmits a PUCCH on a primary cell of a cell group. HARQ-ACK information is either a positive ACK when a TB decoding is correct or a negative acknowledgement (NACK) when a TB decoding is incorrect. An ACK can be represented by a binary '1' value and a NACK can be represented by a binary '0' value.

DL receptions and UL transmissions by a UE (such as the UE 116) can be configured to occur in a corresponding DL bandwidth part (BWP) and UL BWP. A DL/UL BWP is smaller than or equal to a DL/UL bandwidth of a serving cell. DL transmissions from a gNB and UL transmissions from a UE can be based on an orthogonal frequency division multiplexing (OFDM) waveform including a variant using DFT preceding that is known as DFT-spread-OFDM (see also REF1).

Figure 6:
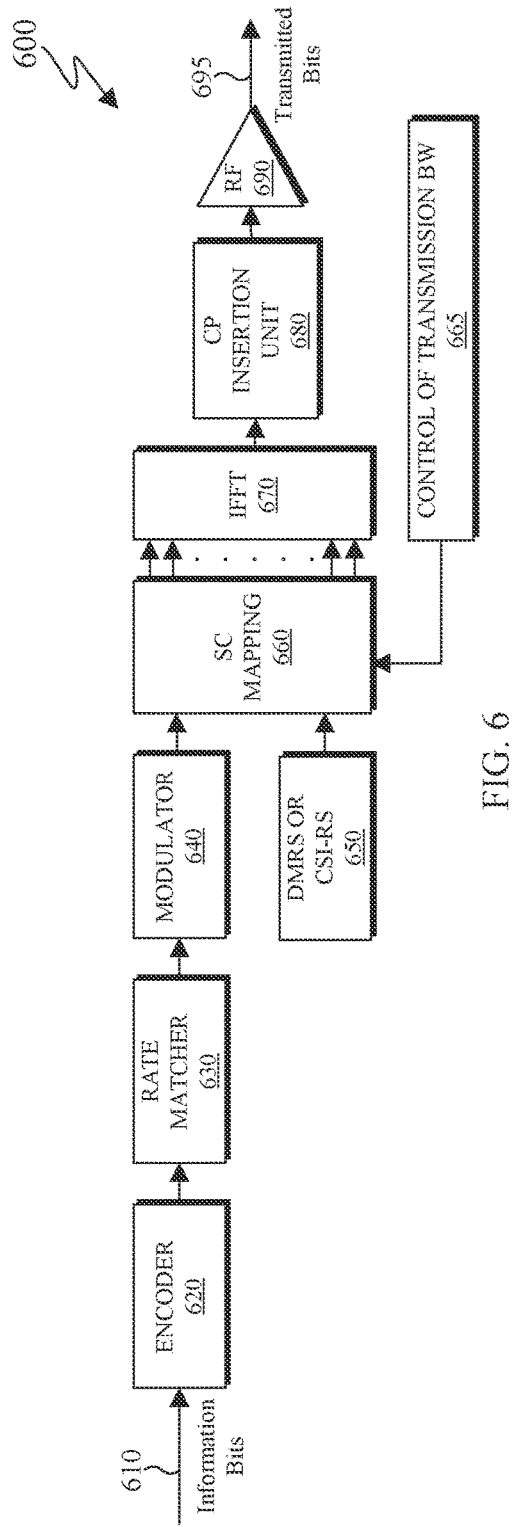
FIG. 6 illustrates a block diagram of an example transmitter structure using orthogonal frequency division multiplexing (OFDM) according to embodiments of the present disclosure.
Figure 7:
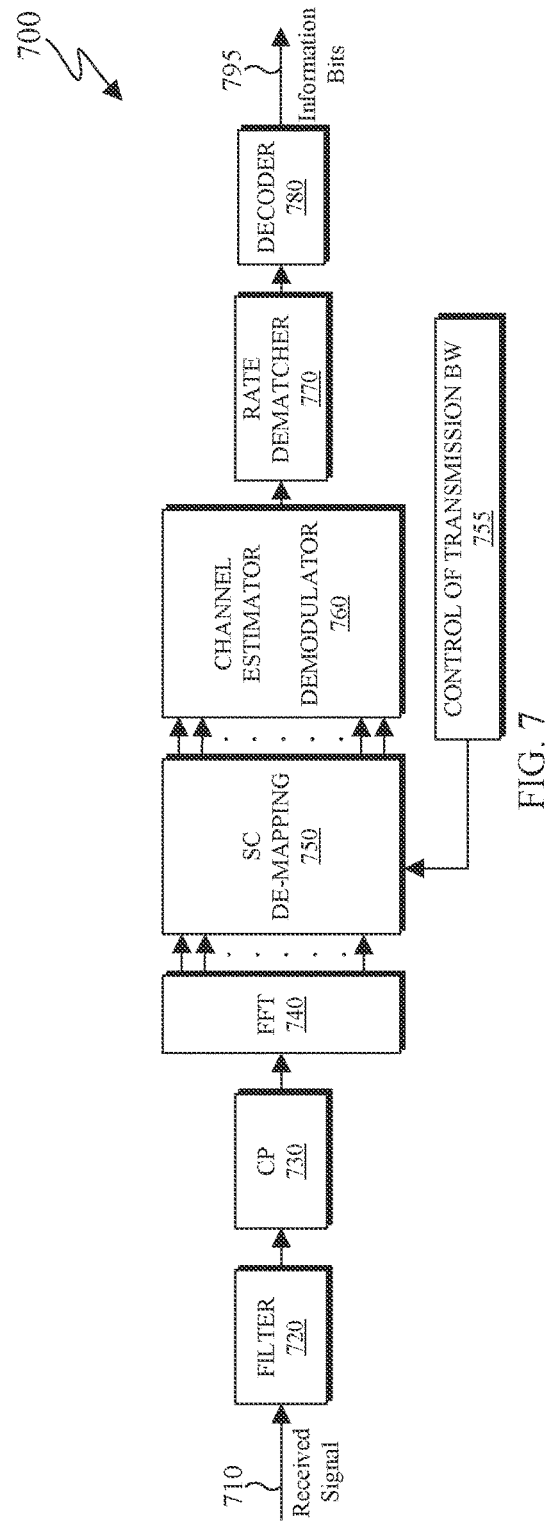
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) multiplexes HARQ-ACK information in a PUCCH that the UE transmits in a slot indicated by a value of PDSCH-to-HARQ_feedback timing indicator field in a last DCI format associated with the HARQ-ACK information, from a set of slot timing values $K_1$, or indicated by higher layers in case of a SPS PDSCH reception as described in REF3. When a UE has received a configuration of PUCCH resource sets, the UE determines a PUCCH resource set based on a UCI payload to multiplex in a PUCCH and determines a PUSCH resource within the PUCCH resource set based on a PUCCH resource index (PRI) in the DCI format.

A UE can also multiplex UCI in a PUSCH transmission. Then, the UE determines a number of UCI coded modulation symbols based on a number of UCI information bits, a spectral efficiency (or MCS) of the PUSCH transmission, and a scaling factor $\beta_{offset}^{PUSCH}$ as described in REF2. Among the REs available for UCI multiplexing in a PUSCH, such as all REs excluding REs in symbols prior to a first symbol with DM-RS REs or in symbols with DM-RS REs or excluding PT-RS REs, the UE can also be provided by higher layers a parameter a that limits a number of available REs that can be used for UCI multiplexing in a PUSCH as described in REF2. When the number of HARQ-ACK information bits is less than or equal to 2, a number of REs are reserved in the PUSCH for HARQ-ACK multiplexing, in order to avoid error events where a gNB expects HARQ-ACK information to be multiplexed in the PUSCH but the UE fails to detect an associated DCI format, and data information symbols that would be multiplexed in the reserved REs are punctured. When the number of HARQ-ACK information bits is larger than two, rate matching is used between data information symbols and HARQ-ACK information symbols. For CSI multiplexing in a PUSCH, CSI symbols are placed at a first PUSCH symbol that is not used for DM-RS multiplexing in the PUSCH.

In certain embodiments, a UE (such as the UE 116) does not expect to multiplex in a PUSCH transmission, or in a PUCCH transmission, HARQ-ACK information that the UE would transmit in different PUCCHs to a same TRP. For multiplexing of HARQ-ACK information in a PUSCH, coded modulation HARQ-ACK symbols are placed after a first symbol of the PUSCH that is used for DM-RS multiplexing or after the first consecutive DM-RS symbols. The multiplexing operation depends on a number of HARQ-ACK information bits. When a PUSCH is transmitted with frequency hopping, the above multiplexing of UCI symbols applies in each hop.

When a gNB (such as the BS 102) schedules a UE (such as the UE 116) to transmit a PUSCH with a number of repetitions, the gNB can also indicate a number of slots $N_w$ as a time window over which the UE is expected to transmit with a constant power and phase. The number of slots $N_w$ can also be same as a number of consecutive slots where the UE transmits a number of repetitions without frequency hopping. For example, in order to maintain a same power for the PUSCH repetitions, the UE can be expected to not process TPC commands during the $N_w$ slots while in order to maintain a constant phase during the $N_w$ slots. In contrast the UE can be expected to apply a same precoding for the PUSCH repetitions during the $N_w$ slots. The number of slots can be same as or different from the number of PUSCH repetitions. This operation is referred in this disclosure as DM-RS bundling over a number of slots. The gNB can obtain a channel estimate from the DM-RS symbols transmitted within the time window for coherent demodulation of data/control symbols. For a number of repetitions in a DM-RS bundle, some repetitions may not include DM-RS as a DM-RS from other repetitions in the DM-RS can be used to obtain a channel estimate for demodulating data information or UCI modulated symbols in the repetitions that do not include DM-RS REs.

In certain embodiments, when a PUSCH transmission is with repetitions and frequency hopping, UCI multiplexing in a second hop can only occur after the PUSCH repetitions in a first hop are completed. Such multiplexing behavior is not problematic if frequency hopping is within a repetition or per repetition but can be problematic for UCI transmission latency when frequency hopping is per block of repetitions as would be beneficial to improve channel estimation for demodulation of data information symbols and UCI symbols. For HARQ-ACK information, the additional latency can lead to stalling of HARQ processes wherein all the HARQ processes for data TBs in the DL are exhausted before corresponding HARQ-ACK information is provided by the UE to a serving gNB. For CSI, the additional latency can lead to a more outdated CSI and an associated DL throughput loss. For example in case of two frequency hops, HARQ-ACK information can be mapped starting from a repetition in a first slot of a first hop, and starting from a repetition in a first slot of a second hop, wherein the first slot of the second hop occurs at least after $N_w$ slots after the first slot in the first hop, depending on whether or not slots unavailable for repetitions are counted as part of the $N_w$ slots.

A PUCCH transmission can also include repetitions. A number of repetitions can be provided by higher layers or, when the PUCCH transmission provides HARQ-ACK information associated with a DCI format, can be indicated by the DCI format. The indication can be based on a separate field in the DCI format that indicates a number of repetitions or can be included in the configuration of PUCCH resources wherein for a PUCCH resource, in addition to parameters such as a PUCCH format, a starting symbol and a number of symbols, or a starting RB and a number of RB s, the configuration can also include a number of repetitions for a PUCCH transmission using the PUCCH resource. However, a UE may transmit a PUCCH with HARQ-ACK information using resources that are indicated by a system information block (SIB), as described in REF3, such as when the PUCCH transmission is prior to the UE establishing a dedicated RRC connection with a serving gNB or even after the UE has a dedicated RRC connection with the gNB and the gNB does not configure PUCCH resource sets to the UE.

For a PUSCH transmission with repetitions from a UE (such as the UE 116), a serving gNB (such as the BS 102) can provide a time domain resource allocation (TDRA) table to the UE wherein entries of the TDRA table include a number of repetitions in addition to including a set of symbols within a slot for a PUSCH transmission, as described in REF4. The UE can determine a set of symbols in a slot and a number of repetitions for a PUSCH transmission based either of a configuration by higher layers or, when the PUSCH transmission is scheduled by a DCI format, based on a TDRA field in the DCI format indicating an entry from the TDRA table. Repetitions of a PUSCH transmission by a UE can be of Type-A, wherein same symbols are used in each slot with a repetition of a PUSCH transmission, or of Type-B wherein nominal repetitions are indicated to the UE and the UE determines actual repetitions based on an availability of symbols for PUSCH transmission in a slot and different symbols can be used in different slots for respective actual repetitions and actual repetitions do not need to be over a same number of symbols, as described in REF4. Embodiments of the disclosure consider Type-A repetitions of a PUSCH transmission. Similar to determining a number of PUCCH repetitions, the aforementioned determination of a number of repetitions for a PUSCH transmission is not applicable when a UE does not have a UE-dedicated (or UE-specific) configuration of a TDRA table as a default TDRA table does not include entries that indicate repetitions for a PUSCH transmission.

Therefore, embodiments of the present disclosure take into consideration that there is a need to reduce a latency of UCI multiplexed in a PUSCH that is transmitted with repetitions and with DM-RS bundling for frequency hopping.

Embodiments of the present disclosure also take into consideration that there is a need to determine REs for multiplexing HARQ-ACK information in a repetition of a PUSCH transmission when the repetition does not include DM-RS REs.

Embodiments of the present disclosure further take into consideration that there is a need to determine a number of repetitions of a PUCCH transmission depending on whether or not a UE is configured by UE-specific higher layer signaling with PUCCH resources for PUCCH transmissions.

Additionally, embodiments of the present disclosure take into consideration that there is a need to determine a number of repetitions of a PUSCH transmission depending on whether or not a UE is configured by UE-specific higher layer signaling a TDRA table for PUSCH transmissions.

Accordingly, embodiments as described herein, relate to reducing a latency of UCI multiplexed in a PUSCH that is transmitted with repetitions and with DM-RS bundling for frequency hopping. The disclosure also relates to determining REs for multiplexing HARQ-ACK information in a repetition of a PUSCH transmission when the repetition does not include DM-RS REs. The disclosure further relates to determining a number of repetitions of a PUCCH transmission depending on whether or not a UE is configured by UE-specific higher layer signaling with PUCCH resources for PUCCH transmissions. The disclosure additionally relates to determining a number of repetitions of a PUSCH transmission depending on whether or not a UE is configured by UE-specific higher layer signaling a TDRA table for PUSCH transmissions.

In the following, when a number of repetitions for a PUSCH transmission or for a PUCCH transmission equals one, the PUSCH transmission or the PUCCH transmission is in a single slot and without repetitions.

Embodiments of the present disclosure describe UCI multiplexing in a PUSCH transmission with repetitions in DM-RS bundles. This is described in the following examples and embodiments, such as those of FIGS. 8-10.

Figure 8:
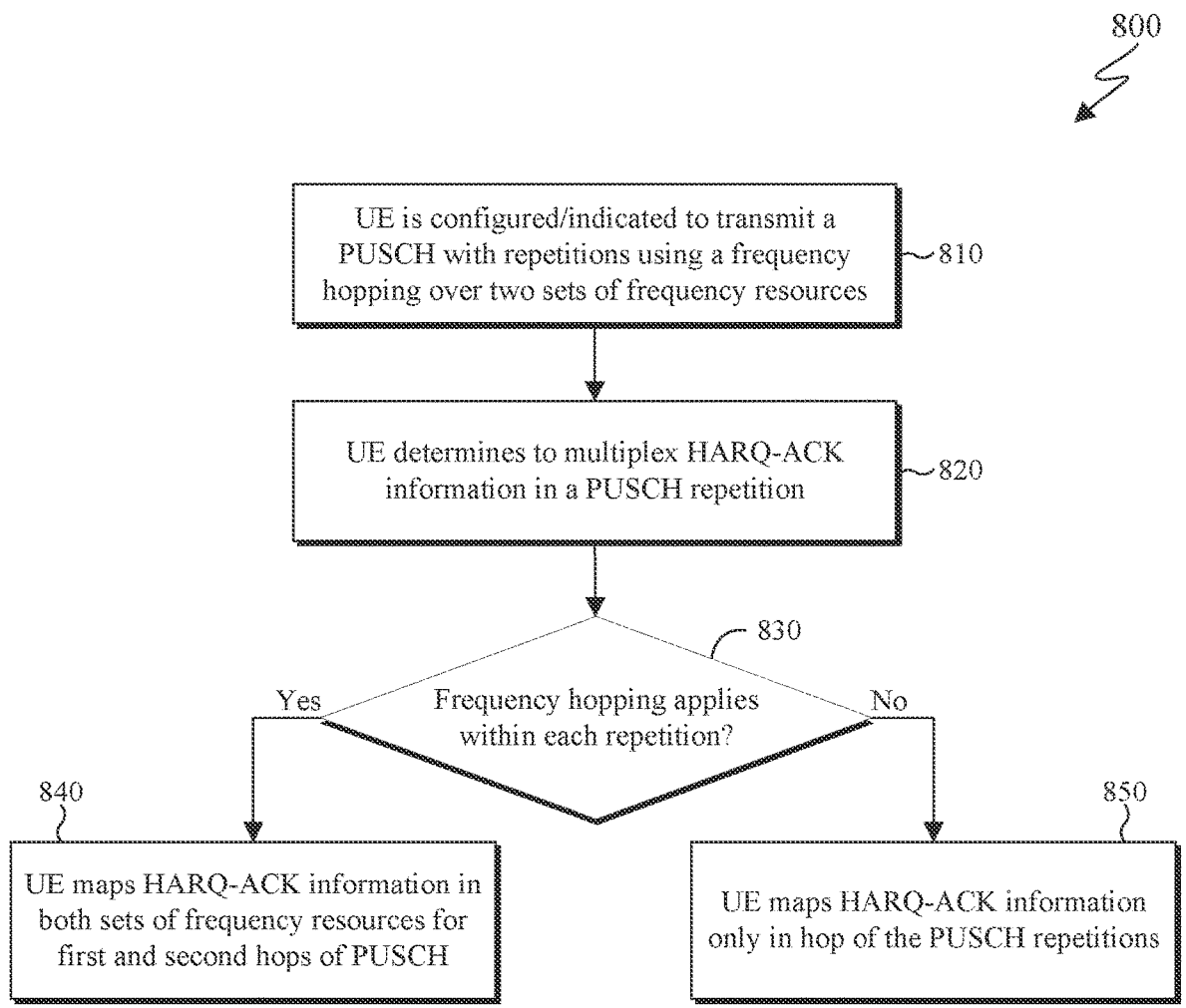
FIG. 8 illustrates a method for determining a mapping of hybrid automatic repeat request (HARQ) acknowledgement (ACK) information in a PUSCH transmission with frequency hopping according to embodiments of the present disclosure.
Figure 9:
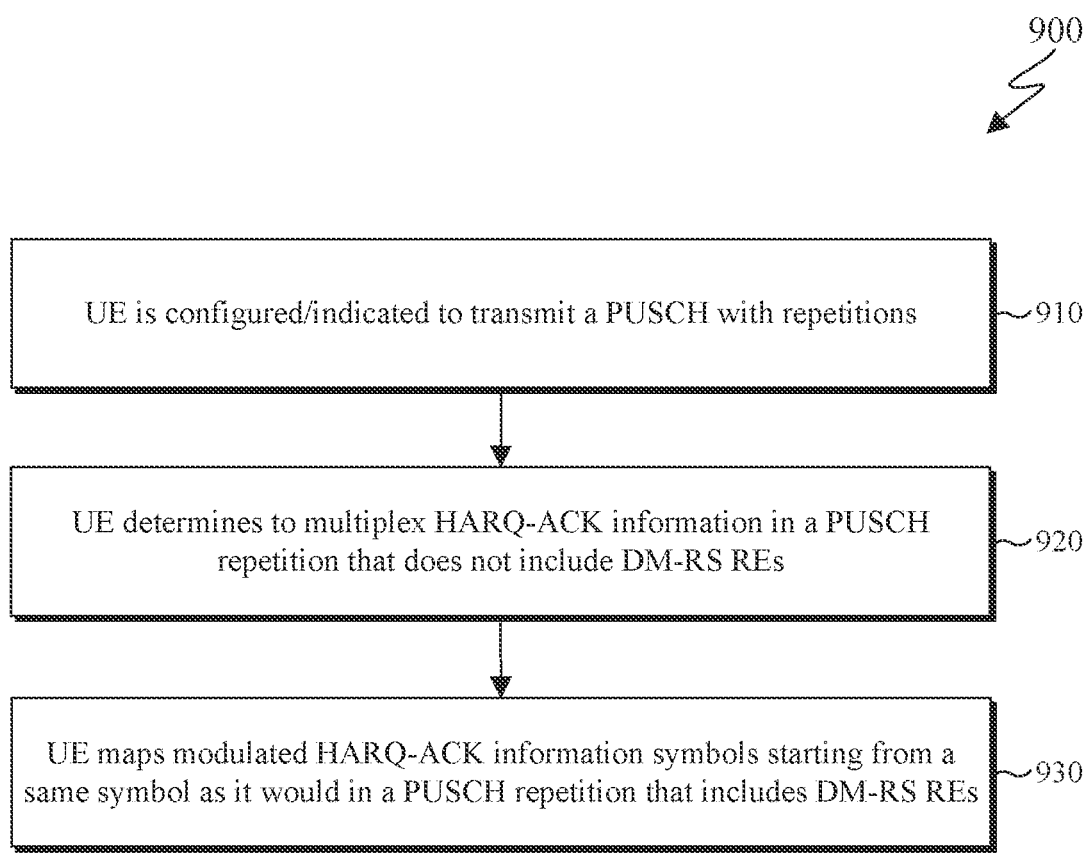
FIG. 9 illustrates a method for determining a mapping of HARQ-ACK information in a PUSCH transmission without demodulation reference signal (DM-RS) resource elements (REs) according to embodiments of the present disclosure.
Figure 10:
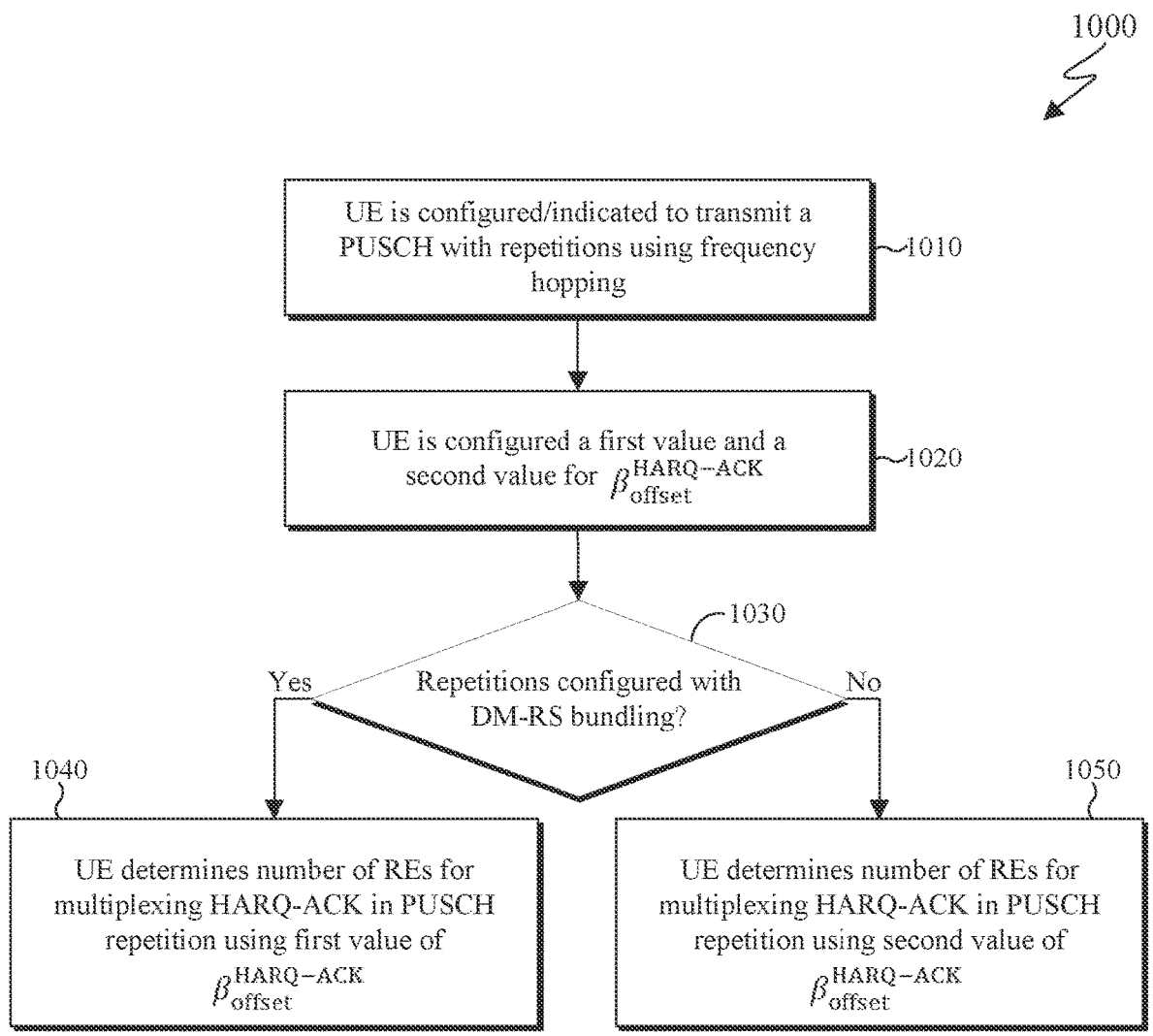
FIG. 10 illustrates a method for determining a number of REs for multiplexing HARQ-ACK information in a repetition of a PUSCH transmission depending on whether the repetition is part of a DM-RS bundle according to embodiments of the present disclosure.

FIG. 8 illustrates a method 800 for determining a mapping of HARQ-ACK information in a PUSCH transmission with frequency hopping according to embodiments of the present disclosure. FIG. 9 illustrates a method 900 for determining a mapping of HARQ-ACK information in a PUSCH transmission without DM-RS REs according to embodiments of the present disclosure. FIG. 10 illustrates a method 1000 for determining a number of REs for multiplexing HARQ-ACK information in a repetition of a PUSCH transmission depending on whether the repetition is part of a DM-RS bundle according to embodiments of the present disclosure.

The steps of the method 800 of FIG. 8, the method 900 of FIG. 9, and the method 1000 of FIG. 10 can be performed by any of the UEs 111-119 of FIG. 1, such as the UE 116 of FIG. 3. The methods 800, 900, and 1000 are for illustration only and other embodiments can be used without departing from the scope of the present disclosure.

In certain embodiments, a gNB (such as the BS 102) can schedule a UE (such as the UE 116) to transmit a PUSCH with a number of repetitions over a number $N_{rep}$ of corresponding slots and also indicate a number $N_w$ of slots, from the $N_{rep}$ slots, that defines a size of a DM-RS bundle. It is also possible that the number of $N_w$ of slots is not directly indicated but is instead determined based on a number of repetitions (such as described in Equation (1), below) when there is one frequency hop after first $N_{rep}/2$ repetitions for remaining $N_{rep}/2$ repetitions (for simplicity, $N_{rep}$ is assumed to be an even number). A mapping of HARQ-ACK information multiplexed in a PUSCH transmission with repetitions can start after a first DM-RS symbol (or first DM-RS consecutive symbols) of a first slot of the bundled slots that would overlap with a PUCCH transmission where the UE would multiplex the HARQ-ACK information if the UE would not transmit the PUSCH. The multiplexing of the HARQ-ACK information in the first slot is subject to satisfying timeline conditions as described in REF3.

$$N_w = N_{rep}/2 \qquad (1)$$

Unlike the mapping of HARQ-ACK information in both frequency hops of a repetition when the UE does not transmit the repetition with DM-RS bundling, the mapping of HARQ-ACK information in a repetition that is part of a bundle of repetitions is without frequency hopping and is only within the repetition of the PUSCH transmission.

In order to reduce a DM-RS overhead and allocate more REs to data information or UCI, a repetition of a PUSCH transmission may not include DM-RS (such as when previous repetitions of the PUSCH transmission in a same DM-RS bundle include DM-RS as such DM-RS can be used for demodulation of data information or UCI in any repetition of a DM-RS bundle). When HARQ-ACK information is multiplexed in a repetition of a PUSCH transmission that does not include DM-RS, a mapping that places modulated symbols of the HARQ-ACK information after a first symbol of the repetition that includes DM-RS is not applicable. A repetition of a PUSCH transmission that does not include DM-RS can be a repetition after a first repetition in each DM-RS bundle in order for a serving gNB to obtain a channel estimate from the first repetition and start demodulation of received modulated symbols in order to reduce a reception latency.

In a first approach, HARQ-ACK information is mapped in a repetition of a PUSCH transmission that does not include any symbol with DM-RS REs in a same manner as for a repetition of the PUSCH transmission that includes a symbol with DM-RS REs. This approach enables a same mapping of HARQ-ACK information in a repetition of a PUSCH transmission regardless of whether or not the repetition includes symbols with DM-RS REs.

In a second approach, HARQ-ACK information is mapped in a repetition of a PUSCH transmission that does not include any symbol with DM-RS REs starting from a first symbol of the repetition, instead of starting after a first symbol that includes DM-RS REs. This approach reduces a latency for reporting HARQ-ACK information and increases a number of REs that are available for multiplexing modulated symbol of the HARQ-ACK information up to a maximum of all REs of the repetition of the PUSCH transmission. Additionally, when CSI is also multiplexed in the repetition that does not include DM-RS REs, the CSI can be multiplexed in REs, if any, after the REs used for the multiplexing of the HARQ-ACK information.

In certain embodiments, a maximum number of REs available for UCI multiplexing in a repetition of a PUSCH transmission can be determined by scaling a total number of REs that are available for UCI multiplexing in the repetition by a parameter a that is provided by higher layers as described in REF2. For multiplexing UCI modulated symbols in a first repetition of a PUSCH transmission that does not include DM-RS REs, in a first example, a total number of REs includes REs in all symbols that include DM-RS REs in a first repetition of the PUSCH transmission that includes DM-RS REs. The first example can also be used in conjunction with the second approach for multiplexing HARQ-ACK information. In a second example, in order to avoid a dependence of a UCI reception reliability on whether or not a repetition of a PUSCH transmission includes DM-RS REs, multiplexing UCI modulated symbols in a first repetition of a PUSCH transmission that does not include DM-RS REs, a total number of REs does not include REs in all symbols that include DM-RS REs in a first repetition of the PUSCH transmission that includes DM-RS REs. The second example can also be used in conjunction with the first approach for multiplexing HARQ-ACK information.

The method 800 as illustrated in FIG. 8 describes an example procedure for a UE to determine a mapping of HARQ-ACK information in a PUSCH transmission with frequency hopping according to the disclosure.

In step 810, a UE (such as the UE 116) is configured/indicated to transmit a PUSCH with repetitions using frequency hopping over two sets of frequency resources. In step 820, the UE determines to multiplex HARQ-ACK information in a repetition of the PUSCH transmission. In step 830, the UE determines whether frequency hopping applies within each repetition of applies per a time window comprising a number of one or more repetitions.

When frequency hopping is within each repetition (as determined in step 830), the UE in step 840 maps HARQ-ACK information in both sets of frequency resources corresponding to the first and second hops of the PUSCH transmission. Alternatively, when frequency hopping is per one or more repetitions (as determined in step 830), the UE in step 850 maps the HARQ-ACK information only in the hop corresponding to the repetition of the PUSCH transmission.

A similar procedure to the one described in FIG. 8 for HARQ-ACK information can be used by a UE to determine a mapping of CSI information in a PUSCH transmission with repetitions and frequency hopping depending on whether or not the repetitions are transmitted according to DM-RS bundling.

For example, the method 900 as illustrated in FIG. 9 describes an example procedure for a UE to determine a mapping of HARQ-ACK information in a PUSCH transmission without DM-RS REs according to the disclosure.

In step 910, a UE (such as the UE 116) is configured/indicated to transmit a PUSCH with repetitions. In step 920, the UE determines to multiplex HARQ-ACK information in a repetition of the PUSCH transmission, wherein the repetition does not include DM-RS REs. For mapping modulated HARQ-ACK information symbols, the UE assumes existence of virtual DM-RS REs in a same symbol as for a previous repetition of a PUSCH transmission that included DM-RS REs and the UE in step 930 maps modulated HARQ-ACK information symbols starting from a first symbol of the repetition that is after the first symbol (or first consecutive number of symbols) that includes virtual DM-RS REs.

When a repetition of a PUSCH transmission is with frequency hopping, a reliability for reception of data information that is provided by the repetition can be improved due to the additional frequency diversity. However, for improving a reception reliability of the data information over multiple repetitions of the PUSCH transmission, it is preferable to apply DM-RS bundling as the benefits from frequency hopping can be obtained from different bundles while an ability to filter DM-RS REs over a DM-RS bundle of repetitions can improve channel estimation thereby leading to additional improvements in reception reliability. It is noted that when UCI is multiplexed only in a single repetition of a PUSCH transmission, the benefit of frequency diversity for the UCI reception is lost when DM-RS bundling is used compared to when frequency hopping applies per repetition of a PUSCH transmission, thereby leading to a degradation in UCI reception reliability. To enhance a UCI reception reliability when UCI multiplexing is in a repetition of a PUSCH transmission that is without frequency hopping, a serving gNB can configure a different corresponding $\beta_{offset}^{PUSCH}$ value than when UCI multiplexing is in a repetition of a PUSCH transmission that is with frequency hopping, such as a larger $\beta_{offset}^{PUSCH}$ value. Such configuration can be applicable when an indication of whether or not repetitions of a PUSCH transmission are with DM-RS bundling is provided by a DCI format scheduling the PUSCH transmission or by a higher layer parameter.

The method 1000 as illustrated in FIG. 10 describes an example procedure for a UE to determine a number of REs for multiplexing HARQ-ACK information in a repetition of a PUSCH transmission depending on whether or not the repetition is part of a DM-RS bundle according to the disclosure.

In step 1010, a UE (such as the UE 116) is configured/indicated to transmit a PUSCH with repetitions using frequency hopping. In step 1020, the UE is configured a first parameter value and a second parameter value for $\beta_{offset}^{HARQ-ACK}$. The first value determines a number of resources for multiplexing HARQ-ACK information in a repetition of a PUSCH transmission when DM-RS bundling is not configured. The second value determines the number of resources for multiplexing HARQ-ACK information in a repetition of PUSCH transmission when DM-RS bundling is configured.

In step 1030, the UE determines whether or not repetitions of a PUSCH transmission are configured with DM-RS bundling. When the UE is configured without DM-RS bundling (as determined in step 1030), the UE in step 1040 determines a number of resources for multiplexing HARQ-ACK information in a repetition of the PUSCH transmission using the first value of $\beta_{offset}^{HARQ-ACK}$. Alternatively, the UE in step 1050 determines a number of resources for multiplexing HARQ-ACK information in a repetition of the PUSCH transmission using the second value of $\beta_{offset}^{HARQ-ACK}$.

Although FIG. 8 illustrates the method 800, the FIG. 9 illustrates the method 900, and the FIG. 10 illustrates the method 1000 various changes may be made to FIGS. 8-10. For example, while the method 800, the method 900, and the method 1000 are shown as a series of steps, various steps could overlap, occur in parallel, occur in a different order, or occur multiple times. In another example, steps may be omitted or replaced by other steps. For example, steps of the method 800, the method 900, and the method 1000 can be executed in a different order.

Embodiments of the present disclosure describe an indication for a number of PUCCH repetitions when a UE does not have dedicated PUCCH resource configurations. This is described in the following examples and embodiments, such as those of FIG. 11.

Figure 11:
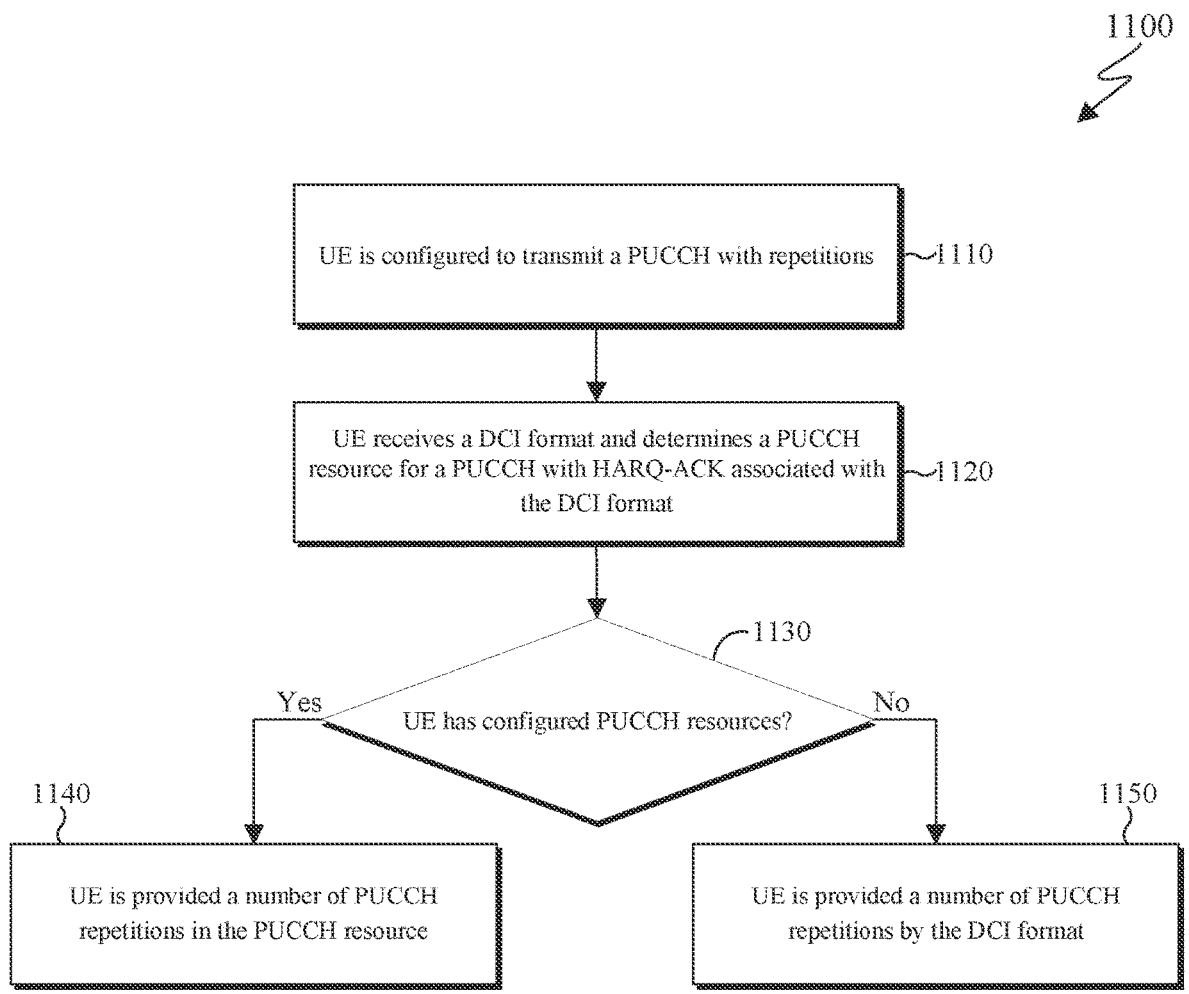
FIG. 11 illustrates a method for determining a number of physical uplink control channel (PUCCH) repetitions depending on whether the UE has dedicated configuration of PUCCH resources according to embodiments of the present disclosure.

FIG. 11 illustrates a method 1100 for determining a number of PUCCH repetitions depending on whether the UE has dedicated configuration of PUCCH resources according to embodiments of the present disclosure.

The steps of the method 1100 of FIG. 11 can be performed by any of the UEs 111-119 of FIG. 1, such as the UE 116 of FIG. 3. The method 1100 is for illustration only and other embodiments can be used without departing from the scope of the present disclosure.

In certain embodiments, a DCI format can include a field ("number of PUCCH repetitions") that indicates a number of repetitions for a PUCCH transmission. The "number of PUCCH repetitions" field can directly indicate the number of repetitions for the PUCCH transmission, for example a field of two bits can indicate 1, 2, 4, or 8 repetitions, or the field can be used to scale a reference number of repetitions provided by higher layers.

When a UE (such as the UE 116) is configured a UE-specific set of PUCCH resources, certain resources can be associated with different number of repetitions. For example, resources associated with a small number of HARQ-ACK information bits, such as up to two HARQ-ACK information bits, can be associated with a smaller number of repetitions that resource associated with a larger number of HARQ-ACK information bits. To exploit such dependence, avoid an overhead in the DCI format that is associated with introducing a "number of PUCCH repetitions" field, and support indication of a number of repetitions by DCI formats that cannot have new fields, such as a DCI format 1_0, a number of PUCCH repetitions can be indicated using a PRI field together with a PUCCH resource. However, an indication of number of repetitions together with a PUCCH resource is possible only when a UE has a UE-specific configuration for PUCCH resource sets; otherwise, the indication of number of PUCCH repetitions should be done independently from resource configuration.

In a first approach, when a UE (such as the UE 116) does not have a UE-specific configuration for PUCCH resource sets and a new field can be added to the DCI format, a "number of PUCCH repetitions" field can be introduced to indicate a number of PUCCH repetitions. For example, the "number of PUCCH repetitions" field can be included in a DCI format 1_1 or a DCI format 1_2. When a new field cannot be added to a DCI format, such as for a DCI format 1_0, and the UE determines a PUCCH resources for a PUCCH transmission with HARQ-ACK information based on DCI format 1_0, a number of repetitions can be based on a configuration for a number of repetitions by higher layers. For example, a UE can be provided a number of repetitions for a PUCCH transmission by higher layers, the UE transmits a PUCCH with the number of repetitions when the UE determines a PUCCH resource based on a DCI format 1_0, and the UE uses the "number of PUCCH repetitions" field to scale the number of repetitions and determine an actual number of repetitions for a PUCCH transmission when the UE determines a PUCCH resource based on a DCI format 1_1 or a DCI format 1_2.

In a second approach, when a UE (such as the UE 116) does not have a UE-specific configuration for PUCCH resource sets, one or more existing fields in a DCI format can be used to indicate a number of repetitions for a PUCCH transmission. For example, as a UE that transmits PUCCH with repetitions is likely to also transmit the PUCCH with maximum power, a TPC command field can be fully or partially used to indicate a number of repetitions. For example, for a TPC command field for two bits, a value can be used to indicate 1, 2, 4, or 8 repetitions or to scale a configured number of repetitions. For example, for a TPC command field for two bits, one value can be used to indicate no repetitions and a power reduction of three dB while the remaining three values can be used to indicate no power reduction and 1, 2, or 4 repetitions. It is noted that 1 repetition means a single transmission of the PUCCH in one slot and is equivalent to no repetitions.

The method 1100 as illustrated in FIG. 11 describes an example procedure for a UE to determine a number of PUCCH repetitions depending on whether or not the UE has dedicated configuration of PUCCH resources according to the disclosure.

In step 1110, a UE (such as the UE 116) is configured to transmit a PUCCH with repetitions. The configuration can be by a corresponding higher layer parameter, or by configuration or repurposing of a field in a DCI format associated with the PUCCH transmission, or as component of at least some PUCCH resources that can be used for the PUCCH transmission.

In step 1120, the UE receives a DCI format and determines a PUCCH resource for transmission of a PUCCH with HARQ-ACK information associated with the DCI format. In step 1130, the UE determines whether the UE has received a UE-specific configuration by higher layers for one or more sets of PUCCH resources.

When the UE received the UE-specific configuration (as determined in step 1130), the UE in step 1140 is provided a number of PUCCH repetitions in the PUCCH resource. Alternatively, the UE in step 1150 is provided a number of PUCCH repetitions by the DCI format.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure describe an indication for a number of PUSCH repetitions when a TDRA table does not include entries with repetitions. This is described in the following examples and embodiments, such as those of FIG. 11.

Figure 12:
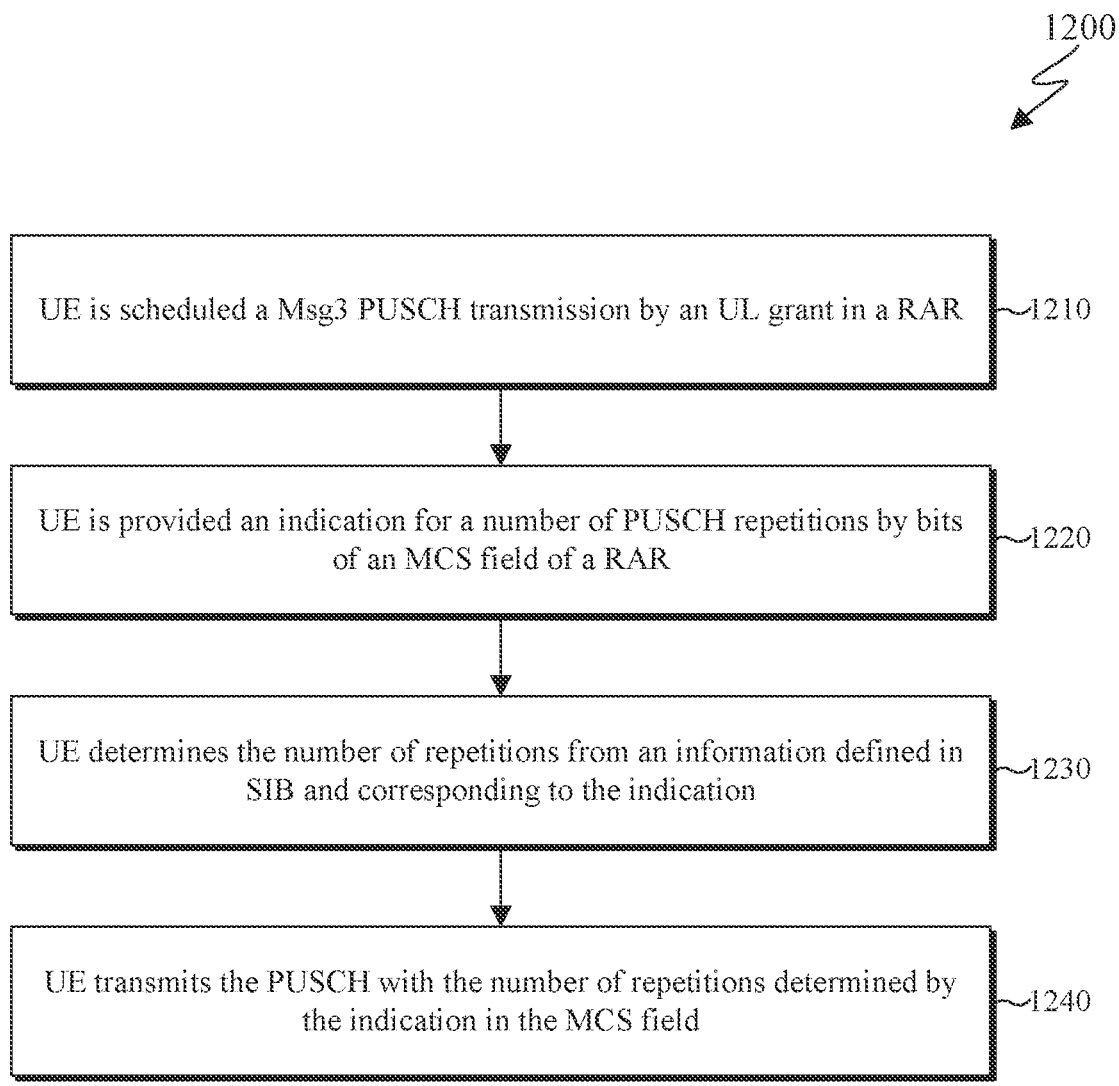
FIG. 12 illustrates a method for determining a number of repetitions of a Msg3 PUSCH transmission that is scheduled by an UL grant in a random access response (RAR) message according to embodiments of the present disclosure.
Figure 13:
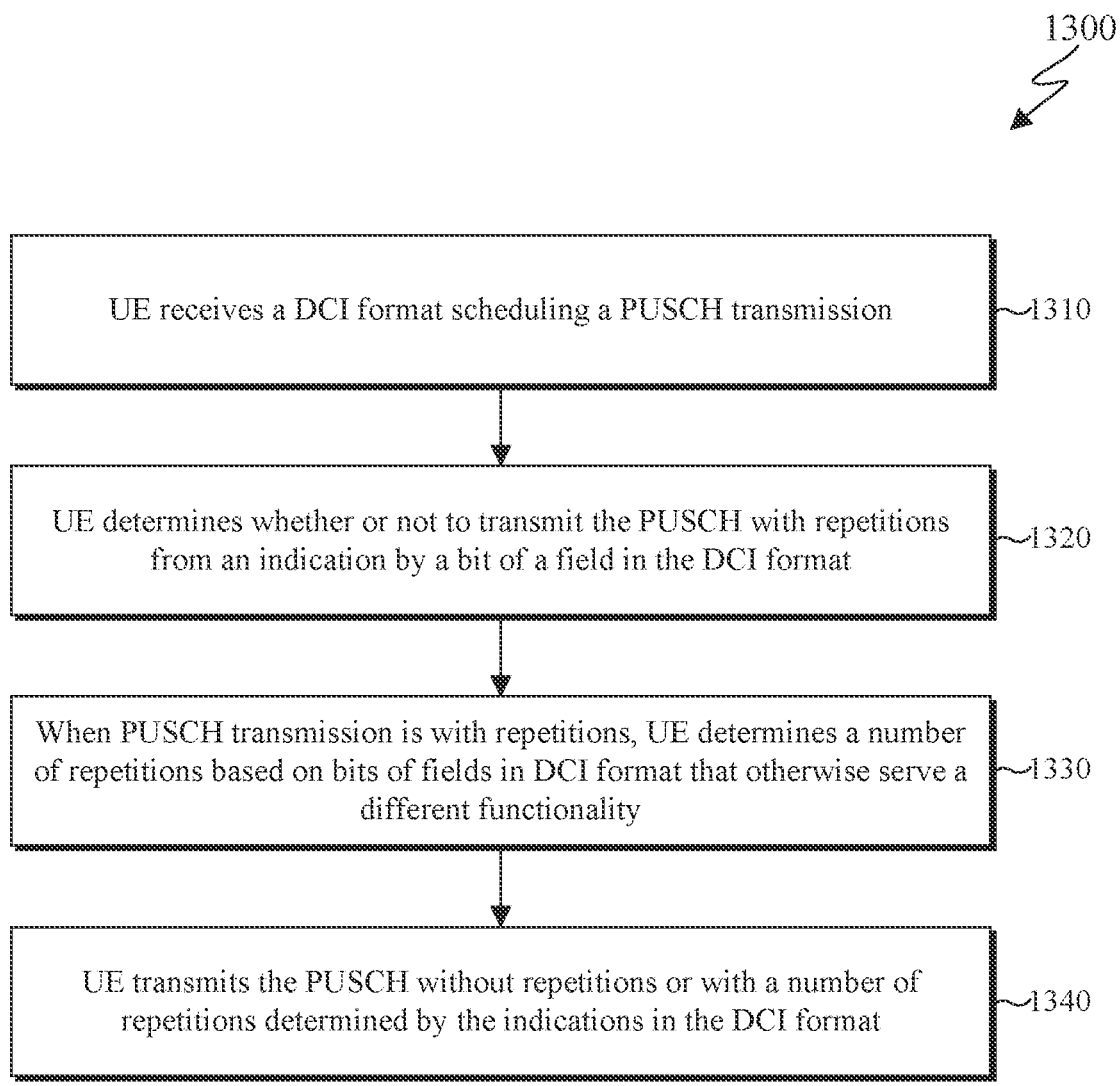
FIG. 13 illustrates a method for determining a number of repetitions for PUSCH transmission prior to UE-dedicated Radio Resource Control (RRC) connection setup according to embodiments of the present disclosure.

FIG. 12 illustrates a method 1200 for determining a number of repetitions of a Msg3 PUSCH transmission that is scheduled by an UL grant in a RAR message according to embodiments of the present disclosure. FIG. 13 illustrates a method 1300 for determining a number of repetitions for PUSCH transmission prior to UE-dedicated RRC connection setup according to embodiments of the present disclosure.

The steps of the method 1200 of FIG. 12 and the method 1300 of FIG. 13 can be performed by any of the UEs 111-119 of FIG. 1, such as the UE 116 of FIG. 3. The method 1200 and the method 1300 are for illustration only and other embodiments can be used without departing from the scope of the present disclosure.

In certain embodiments, a UE (such as the UE 116) can be configured to transmit a PUSCH with repetitions. The PUSCH transmission can be prior to a UE establishing an RRC connection with a serving gNB (such as the BS 102), such as for a Msg3 PUSCH transmission that is part of a random access procedure that a UE performs for initial access to the gNB and is scheduled by a RAR UL grant or by a DCI format 0_0 scrambled by a temporary cell-radio network temporary_identifier (TC-RNTI), or after the UE establishing an RRC connection with the gNB.

A UE can determine a number of slots for repetitions of a PUSCH transmission from a TDRA configuration, or from an indication in a DCI format. It is also possible that the number of slots for the repetitions is indicated by a DCI format by re-purposing bits of existent fields to avoid an overhead in the DCI format that is associated with introducing a new field.

In certain embodiments, when the UE transmits a PUSCH with repetitions, a high order modulation and a high code rate targeting high spectral efficiency for the data information is typically inapplicable. Therefore, only lower entries of a MCS table that can be indicated by an MCS field in a DCI format scheduling a PUSCH transmission with repetitions can be useful. For example, the MCS table can be one that includes smaller spectral efficiency values for a PUSCH transmission instead of one that includes larger spectral efficiency values. For example, for a MCS field that comprises four or five bits, one or more bits can be used as part of a number of bits that are used to indicate a number of repetitions for the PUSCH transmission, and the MCS field can be the field of a RAR UL grant or of a DCI format 0_0 scrambled by a TC-RNTI that schedules the PUSCH transmission. For example, for a PUSCH transmission prior to RRC connection, a TDRA table does not include entries that are associated with repetitions and a DCI format scheduling the PUSCH transmission and includes a TDRA field indicating an entry from the TDRA table cannot indicate a number of repetitions for the PUSCH transmission. To avoid configuring an additional TDRA table by a SIB, an indication for the number of repetitions for a PUSCH transmission can be provided by bits from other fields in the DCI format that can include 1 or more bits from the MCS field. For a Msg3 PUSCH transmission scheduled by an UL grant in a RAR, the indication for the number of repetitions for a PUSCH transmission can be provided by the RAR. For example, the two most significant bits (MSBs) of the MCS field or the two least significant bits (LSBs) of the MCS field can be used to indicate the number of repetitions for Msg3 PUSCH transmission and the remaining two or three bits provide an MCS index. When two bits are used to indicate a number of repetitions, for each MCS index the corresponding PUSCH transmission can be indicated with any of the four numbers of repetitions. In another example, the three MSBs of the MCS field or the three LSBs of the MCS field can be used to indicate the number of repetitions for Msg3 PUSCH transmission and the remaining one or two bits provide an MCS index. A PUSCH transmission corresponding to an MCS index can be scheduled with any of the number of repetitions indicated by bits of the MCS field.

The method 1200 as illustrated in FIG. 12 describes an example procedure for a UE to determine a number of repetitions for a Msg3 PUSCH transmission that is scheduled by an UL grant in a RAR message, according to the disclosure.

In step 1210, a UE (such as the UE 116) is scheduled a Msg3 PUSCH transmission by an UL grant in a RAR. In step 1220, the UE is provided an indication for a number of PUSCH repetitions by bits of an MCS field of a RAR. In step 1230, UE determines the number of repetitions from an information defined in SIB and corresponding to the indication. In step 1240, the UE transmits the PUSCH with the number of repetitions as determined by the indication in the MCS field.

In certain embodiments, when a UE (such as the UE 116) transmits a PUSCH with repetitions, it is likely that the UE uses a maximum power and then a TPC command field in the DCI format scheduling the PUSCH transmission can be fully or partially used to indicate a number of repetitions. For example, for a TPC command field for two bits, a value can be used to indicate 1, 2, 4, or 8 repetitions or to scale a configured number of repetitions. For example, for a TPC command field for two bits, one value can be used to indicate no repetitions and a power reduction of three dB while the remaining three values can be used to indicate no power reduction and 1, 2, or 4 repetitions. It is noted that 1 repetition means a single transmission of the PUCCH in one slot and is equivalent to no repetitions.

In certain embodiments, when a UE (such as the UE 116) transmits a PUSCH with repetitions, use of incremental redundancy can apply by cycling a RV per number of repetitions. The RV cycling pattern can be configured by higher layers or be defined in the specifications of the system operation. Further, for a Msg3 PUSCH transmission, or in general for a PUSCH transmission that provides a small transport block as it is typical in case of repetitions, a benefit from incremental redundancy over chase combining is marginal. Therefore, some or all bits of an RV field in a DCI format scheduling a PUSCH transmission with repetitions can be used to indicate a number of repetitions.

In certain embodiments, when a UE (such as the UE 116) transmits a PUSCH with repetitions, a large bandwidth for the PUSCH transmission is unlikely as the power spectral density per RE becomes smaller and channel estimation accuracy degrades. Therefore, a maximum PUSCH transmission bandwidth can be configured, for example by a SIB, and a frequency domain resource allocation (FDRA) field in a DCI format scheduling the PUSCH transmission with repetitions can have some of its bits, such as one or two MSBs, repurposed to indicate a number of repetitions.

Therefore, prior to establishing an RRC connection, a number of repetitions for a PUSCH transmission can be indicated by a DCI format scheduling the PUSCH transmission by using one or more bits of existing field in the DCI format such as the MCS field, the TPC command field, the RV field, or the FDRA field. A bit from the aforementioned fields can be used to indicate an interpretation for the remaining bits as being a conventional one associated with the functionality of those fields or as indicating a number of repetitions. The bits can be defined in the specification of the system operation. Similar designs can apply for indicating a number of repetitions for a PUCCH transmission from a UE prior to the UE establishing an RRC connection and being configured with UE-specific PUCCH resources, wherein the fields are in a DCI format scheduling a PDSCH reception by the UE.

It is also possible that an additional TDRA table that includes entries with repetitions for a PUSCH transmission is configured by a SIB and a bit from the aforementioned fields is used to indicate a TDRA table that a TDRA field in the DCI format indicates an entry from.

For a Msg3 PUSCH transmission that is scheduled by an UL grant in a RAR message, an indication for a number of repetitions can additionally include reserved bits such as a bit used to request a CSI report for a UE that performs a random access procedure after RRC connection setup.

The method 1300 as illustrated in FIG. 13 describes an example procedure for a UE to determine a number of repetitions for PUSCH transmission prior to UE-dedicated RRC connection setup according to the disclosure.

In step 1310, a UE (such as the UE 116), which is not configured a TDRA table by UE-specific higher layer signaling, receives a DCI format scheduling a PUSCH transmission.

In step 1320, the UE determines whether or not to transmit the PUSCH with repetitions based on an indication by a bit of a field in the DCI format. For a Msg3 PUSCH transmission scheduled by an UL grant in a RAR, the indication is provided by the RAR. The indication can be provided by a bit that is repurposed from a field in the DCI format that otherwise serves a different functionality.

When the indication is to transmit the PUSCH with repetitions, the UE in step 1330 determines a number of repetitions for the PUSCH transmission based on bits of fields in the DCI format that otherwise serve a different functionality. The bits of fields used to determine whether or not the PUSCH transmission is with repetitions and, when applicable, a corresponding number of repetitions can be defined in the specifications of the system operation.

In step 1340, the UE transmits the PUSCH without repetitions or with a number of repetitions as determined by the indications in the DCI format. For example, in step 1340, the indication in DCI format can consist of two bits that can indicate one of four values for the number of repetitions $\{N_{rep1}, N_{rep2}, N_{rep3}, N_{rep4}\}$. Here, the four values can be $\{1,$ 2, 3, 4$\}$ or can be other values in the specifications of the system operation that may or may not include the value of one.

Although FIG. 12 illustrates the method 1200 and FIG. 13 illustrates the method 1300 various changes may be made to FIGS. 12 and 13. For example, while the method 1200 and the method 1300 are shown as a series of steps, various steps could overlap, occur in parallel, occur in a different order, or occur multiple times. In another example, steps may be omitted or replaced by other steps. For example, steps of the method 1200 and the method 1300 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
first information providing a configuration for demodulation reference signal (DM-RS) symbols in each slot over a first number of slots, wherein one or more slots from the first number of slots do not include the DM-RS symbols, and
a physical downlink shared channel (PDSCH) that provides a transport block (TB); and
a processor operably coupled to the transceiver, the processor configured to determine:
hybrid automatic repeat request acknowledgement (HARQ-ACK) information corresponding to a correct or incorrect reception of the TB, and
a mapping of the HARQ-ACK information in a first repetition in a first slot, wherein for symbols that are used for DM-RS in a second repetition:
the mapping includes the symbols when the first repetition does not include the DM-RS symbols, and
the mapping does not include the symbols when the first repetition includes the DM-RS symbols;
wherein the transceiver is further configured to transmit the first repetition with the HARQ-ACK information in the first slot.

2. The UE of claim 1, wherein:
the processor is further configured to determine a mapping for channel state information (CSI), and
the mapping starts after the mapping of the HARQ-ACK information.

3. The UE of claim 1, wherein:
the transceiver is further configured to receive second information providing first and second frequency resources for a physical uplink shared channel (PUSCH) transmission, and
the processor is further configured to determine the mapping of the HARQ-ACK information over only the first frequency resources.

4. The UE of claim 1, wherein:
the transceiver is further configured to receive:
third information indicating a second number of slots from the first number of slots for transmission of repetitions using a same power, and
fourth information providing first and second offset values; and
the processor is further configured to:
instruct the transceiver to transmit physical uplink shared channel (PUSCH) repetitions with the same power over the second number of slots, and
determine a number of resources for multiplexing the HARQ-ACK information in the first repetition using:
the first offset value when the first slot is not in the second number of slots, and
the second offset value when the first slot is in the second number of slots.

5. The UE of claim 1, wherein:
the transceiver is further configured to receive second information for a slot for mapping the HARQ-ACK information in a repetition in the slot, and
the processor is further configured to determine the first slot as an earliest slot, starting from the slot, wherein the first repetition includes the DM-RS symbols.

6. A base station (BS) comprising:
a transceiver configured to transmit:
first information providing a configuration for demodulation reference signal (DM-RS) symbols in each slot over a first number of slots, wherein one or more slots from the first number of slots does not include the DM-RS symbols, and
a physical downlink shared channel (PDSCH) that provides a transport block (TB);
a processor operably coupled to the transceiver, the processor configured to determine:
hybrid automatic repeat request acknowledgement (HARQ-ACK) information corresponding to a correct or incorrect transmission of the TB, and
a mapping of the HARQ-ACK information in a first repetition in a first slot, wherein for symbols that are used for DM-RS in a second repetition:
the mapping includes the symbols when the first repetition does not include the DM-RS symbols, and
the mapping does not include the symbols when the first repetition includes the DM-RS symbols;
wherein the transceiver is further configured to receive the first repetition with the HARQ-ACK information in the first slot.

7. The BS of claim 6, wherein:
the processor is further configured to determine a mapping for channel state information (CSI), and
the mapping starts after the mapping of the HARQ-ACK information.

8. The BS of claim 6, wherein:
the transceiver is further configured to transmit second information providing first and second frequency resources for a physical uplink shared channel (PUSCH) reception, and
the processor is further configured to determine the mapping of the HARQ-ACK information over only the first frequency resources.

9. The BS of claim 6, wherein:
the transceiver is further configured to transmit:
third information indicating a second number of slots from the first number of slots for reception of repetitions using a same power, and
fourth information providing first and second offset values; and
the processor is further configured to:
instruct the transceiver to receive physical uplink shared channel (PUSCH) repetitions with the same power over the second number of slots, and
determine a number of resources for multiplexing the HARQ-ACK information in the first repetition using:
the first offset value when the first slot is not in the second number of slots, and
the second offset value when the first slot is in the second number of slots.

10. The BS of claim 6, wherein:
the transceiver is further configured to transmit second information for a slot for mapping the HARQ-ACK information in a repetition in the slot, and
the processor is further configured to determine the first slot as an earliest slot, starting from the slot, wherein the first repetition includes the DM-RS symbols.

11. A method comprising:
receiving:
first information providing a configuration for demodulation reference signal (DM-RS) symbols in each slot over a first number of slots, wherein one or more slots from the first number of slots does not include the DM-RS symbols, and
a physical downlink shared channel (PDSCH) that provides a transport block (TB);
determining:
hybrid automatic repeat request acknowledgement (HARQ-ACK) information corresponding to a correct or incorrect reception of the TB, and
a mapping of the HARQ-ACK information in a first repetition in a first slot, wherein for symbols that are used for DM-RS in a second repetition:
the mapping includes the symbols when the first repetition does not include the DM-RS symbols, and
the mapping does not include the symbols when the first repetition includes the DM-RS symbols; and
transmitting the first repetition with the HARQ-ACK information in the first slot.

12. The method of claim 11, further comprising determining a mapping for channel state information (CSI), wherein the mapping starts after the mapping of the HARQ-ACK information.

13. The method of claim 11, further comprising:
receiving second information providing first and second frequency resources for a physical uplink shared channel (PUSCH) transmission; and determining the mapping of the HARQ-ACK information over only the first frequency resources.

14. The method of claim 11, further comprising:
receiving:
- third information indicating a second number of slots from the first number of slots for transmission of repetitions using a same power, and
- fourth information providing first and second offset values;

transmitting physical uplink shared channel (PUSCH) repetitions with the same power over the second number of slots; and determining a number of resources for multiplexing the HARQ-ACK information in the first repetition using:
- the first offset value when the first slot is not in the second number of slots, and
- the second offset value when the first slot is in the second number of slots.

15. The method of claim 11, further comprising:
receiving second information for a slot for mapping the HARQ-ACK information in a repetition in the slot; and
determining the first slot as an earliest slot, starting from the slot, wherein the first repetition includes the DM-RS symbols.

* * * * *